US011714190B1

(12) United States Patent
Duncklee et al.

(10) Patent No.: US 11,714,190 B1
(45) Date of Patent: Aug. 1, 2023

(54) METHODS AND SYSTEMS FOR RADAR TESTING AND DEVELOPMENT USING HARDWARE-IN-THE-LOOP WITH CONTINUOUS INTEGRATION

(71) Applicant: Waymo LLC, Mountain View, CA (US)

(72) Inventors: Kevin Duncklee, Mountain View, CA (US); Irving Chung, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 243 days.

(21) Appl. No.: 17/316,991

(22) Filed: May 11, 2021

(51) Int. Cl.
*G01S 13/931* (2020.01)
*G01S 7/40* (2006.01)
*G01S 13/86* (2006.01)
*G01S 13/00* (2006.01)

(52) U.S. Cl.
CPC .......... *G01S 13/931* (2013.01); *G01S 7/4004* (2013.01); *G01S 13/865* (2013.01); *G01S 13/867* (2013.01)

(58) Field of Classification Search
None
See application file for complete search history.

(56) References Cited

U.S. PATENT DOCUMENTS

| 10,036,800 B2 | 7/2018 | Schofield | |
| 10,742,969 B1 * | 8/2020 | Rohatgi | G01S 15/931 |
| 10,785,474 B1 * | 9/2020 | Semansky | G01S 13/931 |

(Continued)

FOREIGN PATENT DOCUMENTS

| EP | 2818888 B1 | 3/2019 | | |
| WO | WO2015/009217 A1 * | 1/2015 | ........... | G01S 13/931 |
| WO | WO2017/065678 A1 * | 4/2017 | ........... | G01S 13/867 |

OTHER PUBLICATIONS

M. Elgharbawy, A. Schwarzhaupt, G. Scheike, M. Frey and F. Gauterin, "A generic architecture of ADAS sensor fault injection for virtual tests," 2016 IEEE/ACS 13th International Conference of Computer Systems and Applications (AICCSA), Agadir, Morocco, 2016, pp. 1-7, doi: 10.1109/AICCSA.2016.7945680. (Year: 2016).*

(Continued)

*Primary Examiner* — Bernarr E Gregory
(74) *Attorney, Agent, or Firm* — McDonnell Boehnen Hulbert & Berghoff LLP

(57) ABSTRACT

Example embodiments relate to techniques for hardware-in-the-loop testing with continuous integration for radar testing and development. A computing device may receive a target output for radar operation parameters undergoing development tests and determine whether a first output produced by a field programmable gate array (FPGA) based on the radar operation parameters differs from the target output less than a first threshold difference. When the output from the FPGA passes the comparison, the computing device may then cause a radar unit to transmit radar signals toward a target according to the radar operation parameters, which produces a second output that can also be compared to the target output. The FPGA may process signals for the radar unit. In some cases when the second output differs from the target output less than a second threshold difference, the computing device may provide the radar operation parameters as a radar software update to vehicles.

20 Claims, 10 Drawing Sheets

(56) References Cited

U.S. PATENT DOCUMENTS

| | | | |
|---|---|---|---|
| 10,818,036 B1* | 10/2020 | Lee | G01S 13/931 |
| 2019/0204425 A1* | 7/2019 | Abari | G01S 13/931 |
| 2019/0303759 A1 | 10/2019 | Farabet | |
| 2020/0363501 A1* | 11/2020 | Lau | G01S 13/931 |
| 2020/0379085 A1 | 12/2020 | Subburaj | |
| 2020/0408889 A1* | 12/2020 | Nee | G01S 13/931 |
| 2020/0410715 A1* | 12/2020 | Cadien | G01S 13/865 |
| 2021/0134079 A1* | 5/2021 | Nee | G01S 13/931 |

OTHER PUBLICATIONS

Irarte, "Hardware-in-the-loop simulation testing for defense and aerospace systems", Sep. 19, 2016, https://militaryembedded.com/avionics/safety-certification/hardware-in-the-loop-simulation-testing-defense-aerospace-systems, retrieved May 11, 2021.

* cited by examiner

METHODS AND SYSTEMS FOR RADAR TESTING AND DEVELOPMENT USING HARDWARE-IN-THE-LOOP WITH CONTINUOUS INTEGRATION

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for hardware-in-the-loop (HIL) testing with continuous integration (CI) for radar testing and development. Such techniques enable software upgrades for vehicle radar systems to be compiled from multiple software developers and thoroughly examined via simulations and tests that use the same physical radar hardware as located onboard the vehicles performing operations in various simulated environment conditions prior to the distribution to vehicle radar systems operating in numerous locations. As a result, vehicle radar systems operating in various environments can be updated regularly via over-the-air updates that pass desired performance levels prior to implementation onboard each vehicle.

In one aspect, an example method is provided. The method involves receiving, at a computing device, radar operation parameters and a target output for the radar operation parameters and obtaining, at the computing device, a first output from a field programmable gate array (FPGA) associated with a radar unit. The FPGA generates the first output based on the radar operation parameters. The method also involves determining whether the first output differs from the target output less than a first threshold difference and causing the radar unit to transmit radar signals toward a target according to the radar operation parameters based on determining that the first output differs from the target output less than the first threshold difference. The method further involves obtaining, at the computing device, a second output from the radar unit. The radar unit generates the second output based on reflection signals from the target. The method also involves determining whether the second output differs from the target output less than a second threshold difference and providing, by the computing device, the radar operation parameters as a radar software update to one or more radar units based on determining that the second output differs from the target output less than the second threshold difference.

In another aspect, an example system is provided. The system includes a radar unit having a FPGA and a computing device. The computing device is configured to receive radar operation parameters and a target output for the radar operation parameters and obtain a first output from the FPGA. The FPGA generates the first output based on the radar operation parameters. The computing device is further configured to determine whether the first output differs from the target output less than a first threshold difference and cause the radar unit to transmit radar signals toward a target according to the radar operation parameters based on determining that the first output differs from the target output less than the first threshold difference. The computing device is also configured to obtain a second output from the radar unit where the radar unit generates the second output based on reflection signals from the target. The computing device is further configured to determine whether the second output differs from the target output less than a second threshold difference and provide the radar operation parameters as a radar software update to one or more radar units based on determining that the second output differs from the target output less than the second threshold difference.

In yet another example, an example non-transitory computer-readable medium configured to store instructions, that when executed by a computing system comprising one or more processors, causes the computing system to perform operations. The operations involve receiving radar operation parameters and a target output for the radar operation parameters and obtaining a first output from a FPGA associated with a radar unit. The FPGA generates the first output based on the radar operation parameters. The operations also involve determining whether the first output differs from the target output less than a first threshold difference and, based on determining that the first output differs from the target output less than the first threshold difference, causing the radar unit to transmit radar signals toward a target according to the radar operation parameters. The operations further involve obtaining a second output from the radar unit where the radar unit generates the second output based on reflection signals from the target and determining whether the second output differs from the target output less than a second threshold difference. The operations also involve providing the radar operation parameters as a radar software update to one or more radar units based on determining that the second output differs from the target output less than the second threshold difference.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
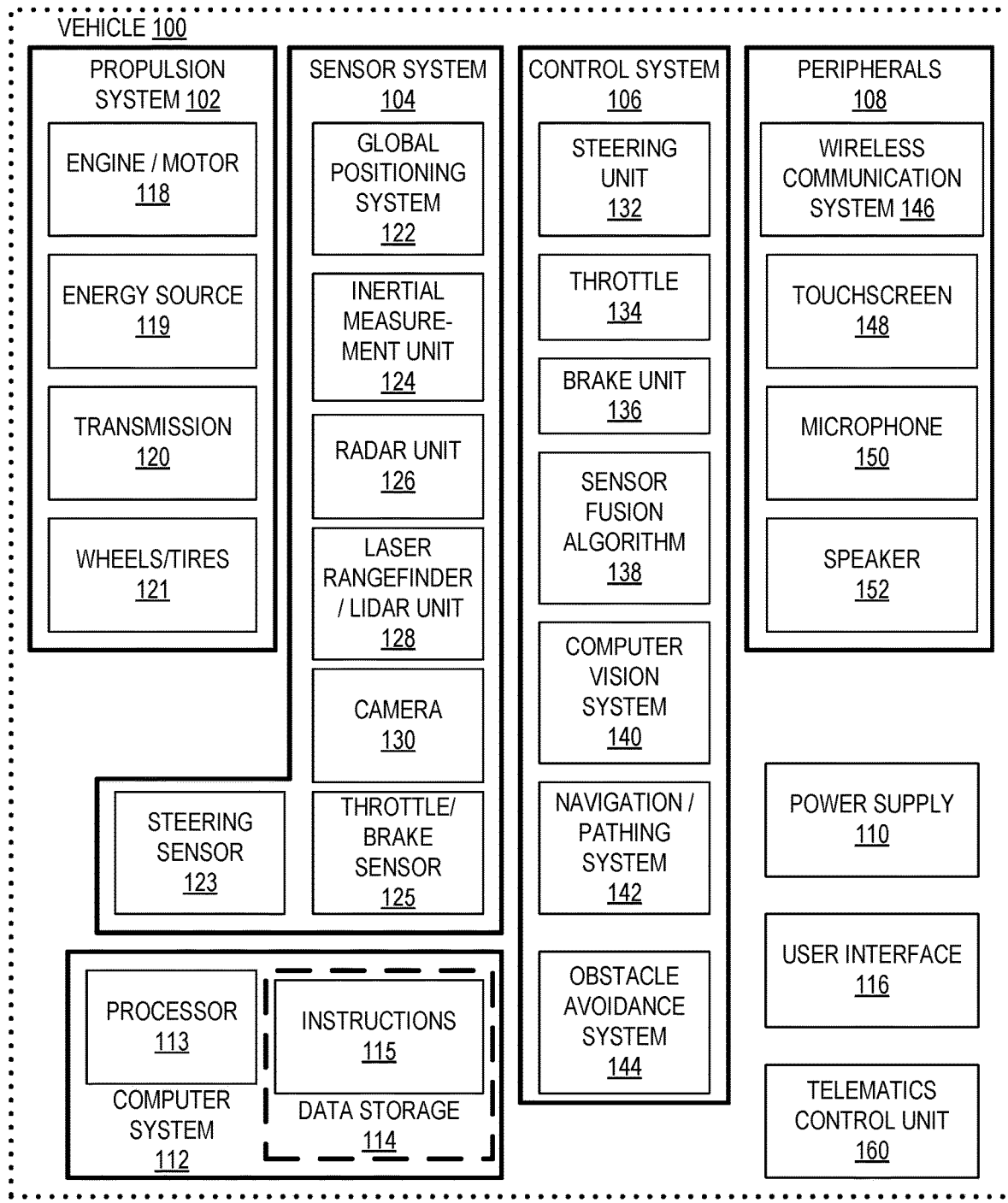
FIG. 1 is a functional block diagram illustrating a vehicle, according to one or more example embodiments.
Figure 2A:
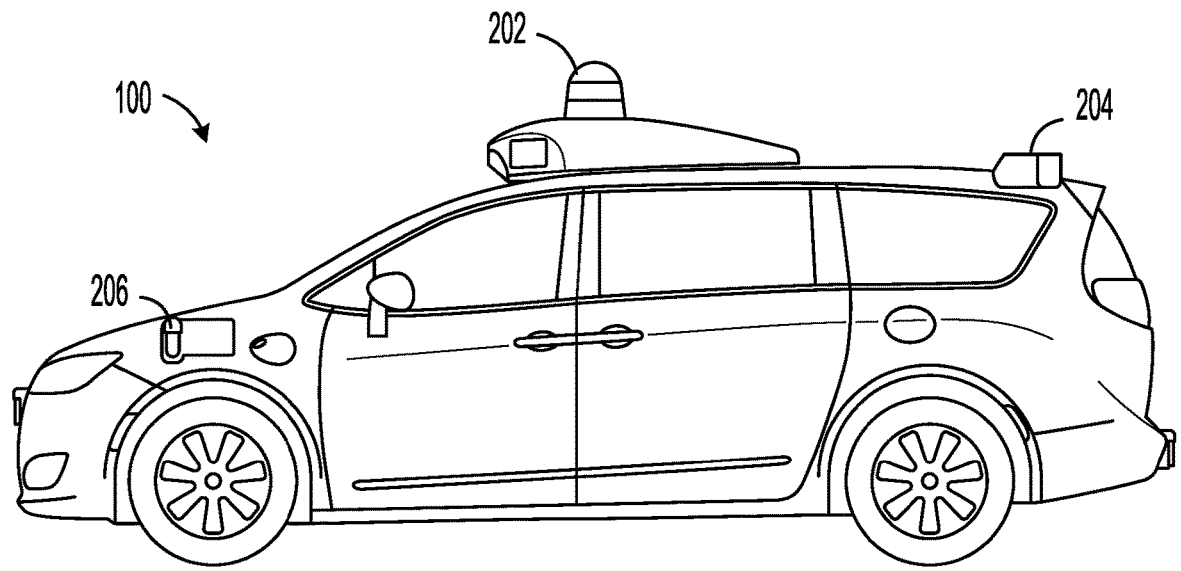
FIG. 2A illustrates a side view of a vehicle, according to one or more example embodiments.
Figure 2B:
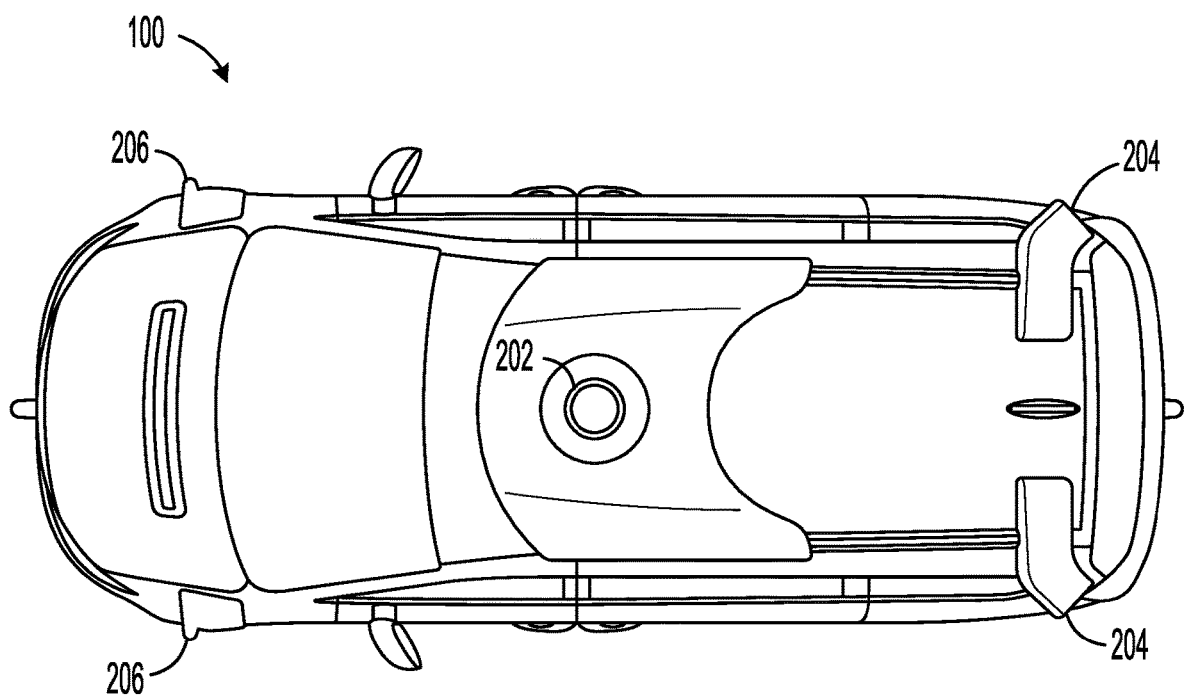
FIG. 2B illustrates a top view of a vehicle, according to one or more example embodiments.
Figure 2C:
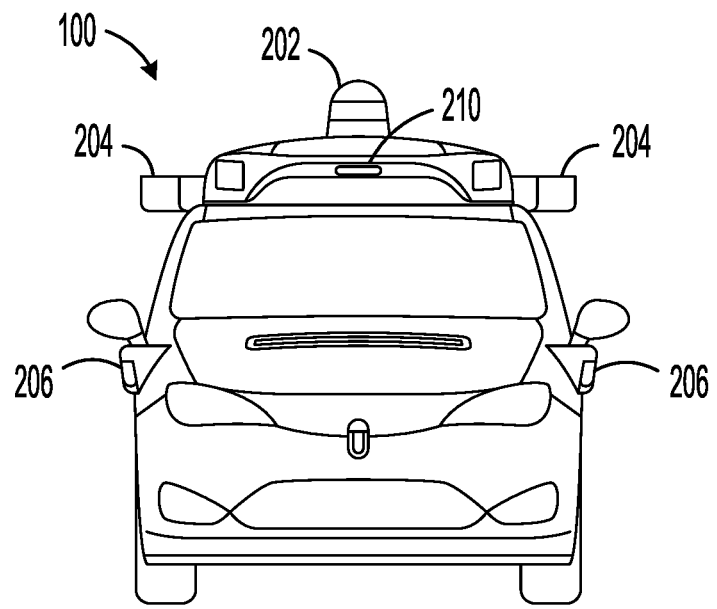
FIG. 2C illustrates a front view of a vehicle, according to one or more example embodiments.
Figure 2D:
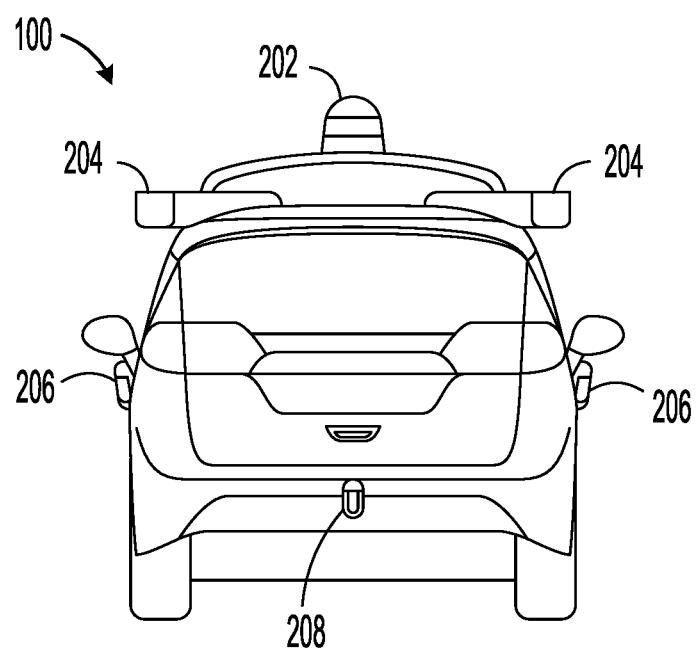
FIG. 2D illustrates a back view of a vehicle, according to one or more example embodiments.
Figure 2E:
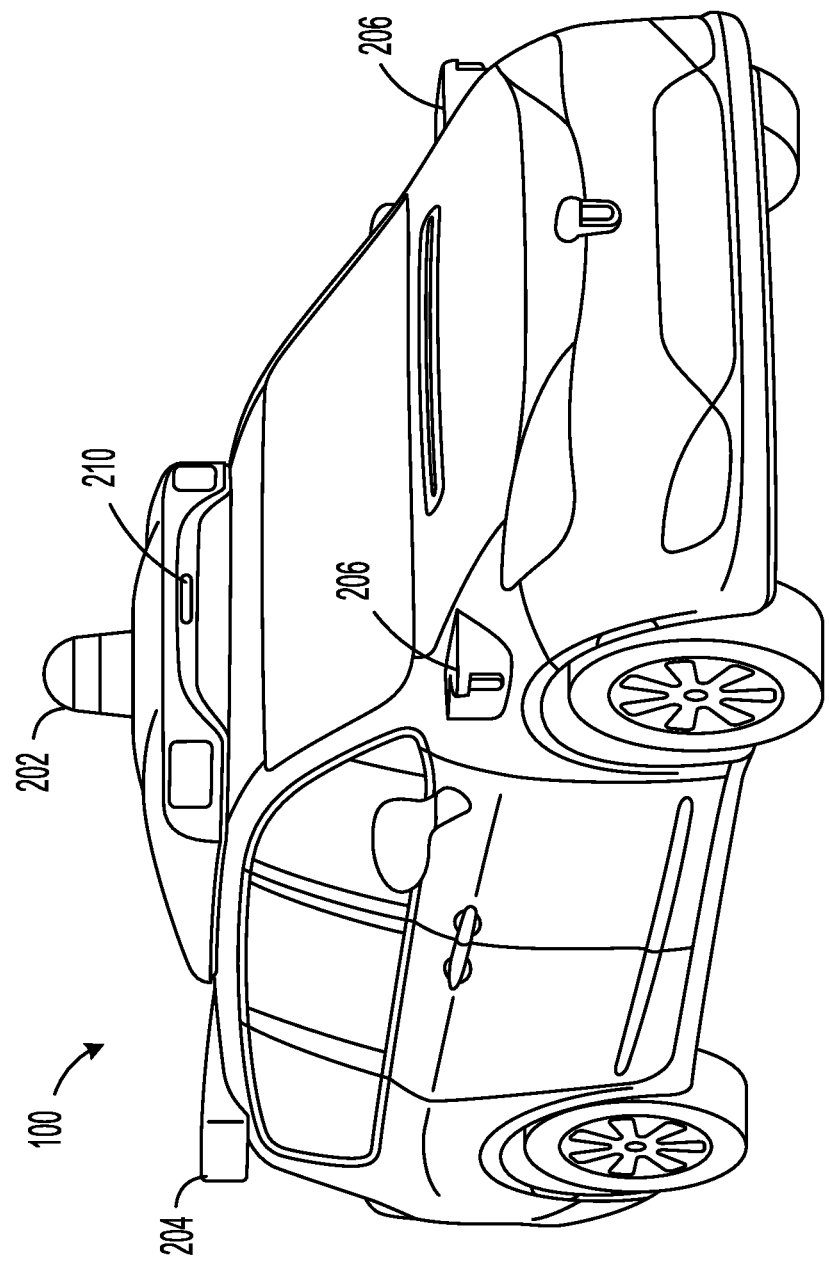
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting electromagnetic signals (radar signals) and analyzing the backscattered signals received from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit.

A radar processing system (e.g., a computing device) may process radar data to generate two dimensional (2D) and/or three dimensional (3D) measurements that represent aspects of the environment, such as the positions, orientations, and movements of nearby objects and other surfaces occupying the environment near the radar system. Because a radar system can be used to measure distances and motions of nearby objects and other surfaces, vehicles are increasingly incorporating vehicle radar systems that can obtain and provide useful information for vehicle navigation, obstacle avoidance, and other vehicle operations that can boost overall vehicle safety.

During navigation, radar can be used to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, radar can offer a reliable contribution that vehicle systems use to continuously monitor and understand changes in various environments. In some applications, radar supplements sensor data from other types of sensors, such as cameras and lasers.

In some applications, a vehicle radar system can provide information aimed to assist the vehicle's driver. For instance, radar measurements may enable vehicle systems to generate alerts in various situations, such as when the vehicle drifts outside its current lane, when the vehicle travels too closely to another vehicle or object, and/or in other ways that can help the driver safely control the vehicle. Radar measurements can also be used to help enable autonomous or semi-autonomous operations by the vehicle. In particular, radar data can be used by control systems to understand and safely navigate the vehicle's environment in near real-time.

To obtain measurements of different regions of a vehicle's environment, a vehicle radar system may use one or more antenna arrays. For instance, a controller (e.g., a computing device) operating the vehicle radar system can transmit respective phase-shifted control signals for each individual antenna in an antenna array to perform phased array beam steering. The constructive interference that creates a combined RF signal from the array aimed in the desired direction (i.e., the beam) may also produce radiation in undesired directions, known as sidelobes. In some applications, it can be particularly desirable to keep the array sidelobe level below a particular threshold (e.g., −60 decibels below the carrier (dBc)) and at a particular angular resolution (e.g., 1 degree or less) to enable the processing system to differentiate between far range, closely-spaced target objects.

Because a vehicle sensor system often uses radar to understand aspects of a vehicle's surrounding environment, it is desirable for radar measurements to be accurate. In some cases, however, issues can arise that can impair the performance of the vehicle radar system, such as bugs or other errors in the software code used by the vehicle radar system for signal transmission, reception, and/or processing. Additionally, FPGAs operating as part of the vehicle radar system are also susceptible bugs and errors within firmware executed by the FPGAs. Other aspects can also impact vehicle radar operations, such as changes in the environment (e.g., precipitation, temperature changes) that can cause radar units to degrade over time.

To overcome potential issues that can arise, vehicle radar systems are often calibrated periodically, which can involve the installation of new software and/or firmware updates. Software updates can be implemented by vehicle radar systems and can impact radar accuracy and performance during vehicle navigation. The firmware, also referred to herein as gateware, is used by FPGAs associated with a vehicle radar system. In some instances, firmware updates can specify changes to the programming of physical gates associated with each FPGA.

Although these software updates and firmware updates are typically designed to eliminate previously detected issues, the updates can also be susceptible to potential bugs and other errors that might not have been detected during development. In some cases, bugs or other issues may arise after a substantial amount of time after installation at the vehicle radar system (e.g., after hours, days, or weeks of use). Each issue can limit performance by radar systems, which can impact vehicle operations in some cases until fixed. When these issues are detected onboard vehicles operating in the real-world, producing a fix for the issue can take substantial time in some cases. Thus, because debugging radar firmware and software failures in the field is a complex and time costly process, it is desirable to detect and eliminate potential issues within software updates and firmware updates prior to implementation onboard vehicles for use by vehicle radar systems.

Existing techniques aim to limit these potential issues by putting software updates and firmware updates through intensive tests before distribution to vehicle radar systems. These intensive tests can take a substantial amount of time to complete, which can result in a significant delay between when an issue was detected and the time the update was distributed to fix the issue. In some cases, other errors may be detected during the delay, which can require further delay in the distribution of the update. In addition, some techniques involve testing an upgrade in its entirety, which can cause delays when errors are detected in a portion of the upgrade that requires changes to numerous portions of the upgrade.

Accordingly, to improve the efficiency with which radar software and firmware updates are tested and developed, example embodiments presented herein relate to testing and development techniques that incorporate HIL testing and CI. Such techniques can allow software and firmware currently implemented by vehicle radar systems to be also tested in parallel via simulations and partial simulations that use the same radar hardware on the vehicles in a radar test chamber under a variety of conditions and tests. In addition, as new aspects are coded into software updates and/or firmware updates for vehicle radar systems, the techniques allow for efficient testing and distribution of these updates to vehicles via over-the-air updates without significant delays that can arise from using the existing techniques discussed above.

In practice, HIL simulation enables testing a system in an arrangement that simulates some physical hardware connected to the control system. To focus on some physical hardware and also potentially remove other physical hardware from a system, different mathematical relationships can be utilized that enable simulation of actions typically performed by the removed physical hardware based on controls from the control system. For example, since in-vehicle driving tests for evaluating performance are often time-consuming, expensive, and not reproducible, HIL simulations can enable developers to validate new hardware (e.g., radar) and software solutions until outputs generated under various tests meet desired performance standards.

Example techniques may involve combining simulations with real-world testing of radar hardware to ensure that software and firmware perform as expected. The radar hardware used for tests can match the radar hardware used onboard vehicles. By way of an example, a computing device can initially obtain radar operation parameters and a target output for the radar operation parameters. The radar operation parameters may represent radar software (or a portion of radar software (e.g., a patch)) for use by a vehicle radar system (or currently in-use by vehicle radar systems) and/or firmware for updating one or more FPGAs associated with the vehicle radar system.

The target output, also referred to herein as golden data, can represent the expected output or expected outputs that should be obtained when the radar operation parameters are implemented and tested under various conditions. In order to generate the target output, a functional model designed to emulate radar tests conditions can be used. For instance, the radar software and/or firmware update code can be executed by the functional model (e.g., a C-model) designed to replicate testing conditions and produce the target output (i.e., the golden data) using the performance parameters detailed within the update undergoing testing.

By generating the target output, subsequent radar can have a baseline for comparison that indicates whether or not the FPGA, radar hardware, and/or other radar system components perform accurately during various tests. For example, because the target output or target outputs represents one or more desired outputs for radar software/firmware undergoing testing, the functional model can produce target output information for one or both of FPGA associated with a radar unit and the output generated by operating the radar unit according to the radar operation parameters.

In some cases, CI can be used to develop radar software and/or firmware undergoing tests and development. CI represents a development practice where the software developers can integrate code into a shared repository frequently. For instance, developers can contribute code into one or more repositories as desired, which can vary based on each developer's preference. In some examples, computing devices may automatically perform CI to ensure that contributions from developers are collected together periodically to generate a redundant copy that can undergo tests in cases of a failure or failures at individual developer's computing devices.

Software code and/or firmware code can then be verified via one or more example radar HIL tests described herein. As such, CI can enable efficient development of updates while also enabling errors to be detected and located quickly within portions of newly written code. CI can also enable cooperation among numerous developers while also allowing frequent development and testing of portions of upgrades that can be implemented at vehicle radar systems after passing performance tests.

In some embodiments, after obtaining the radar software and/or firmware update for testing from a shared repository or another source, the computing device may initially test one or more operational aspects of a vehicle radar system. For example, the computing device (or a network of devices) may initially test the performance of a FPGA associated with a radar unit. In practice, the FPGA may be the same type used by a vehicle radar system to minimize variables (e.g., different manufacturers or designs) that can potentially cause issues when implementing a firmware update onboard vehicles.

The computing device may provide the firmware update that specifies changes in code related to radar operation parameters for implementation on the FPGA and subsequently compare the output from the FPGA to the golden data produced by the functional model. The functional model may simulate operations performed by the FPGA to produce the target output. For example, the functional model can be designed to simulate operations of the FPGA. As such, a development team may review the outputs by the functional model to see if the target output matches desired results as programmed.

In some cases, the comparison between the actual output for a FPGA and the expected output generated via the functional model may match. In such a case, this can indicate that the output from the FPGA substantially matches the golden data (e.g., less than a threshold difference), the computing device can proceed with further testing of the radar operation parameters. For instance, the bit information output by the FPGA may match the bit information within the golden data, which indicates that the FPGA processed the radar operation parameters as originally intended without any issues or potential bugs. The bit information may represent bitstream (e.g., binary data) output from the FPGA processing the upgrade.

In addition, to further prepare updates for implementation at vehicle radar systems, the computing device may proceed with more tests on the radar operation parameters using radar hardware. In particular, example tests may involve testing the actual radar hardware used on vehicles in a radar test chamber. Similar to using the same type of FPGA as implemented onboard vehicles, using the same type and model of radar hardware can reduce variables that can potentially cause issues when implementing software and firmware updates locally onboard vehicles.

Radar hardware testing can involve causing one or more radar hardware units (e.g., antennas and corresponding components) to transmit signals toward one or more targets according to the radar operation parameters specified in the software code undergoing tests. The radar hardware can be positioned within a radar test chamber that enables adjusting variables to simulate different testing conditions. For example, the radar test chamber can include one or more types of targets that can simulate different distances, radar cross sections, azimuths, and motions relative to the radar hardware undergoing tests. The targets can simulate different objects encountered in a vehicle's environment, such as signs, other vehicles, and roadway elements, etc.

The radar test chamber can also simulate different conditions that can impact radar performance in the real world. For instance, the temperature of the radar test chamber can be adjusted to simulate vehicles navigating in different locations. Humidity and precipitation can also be simulated within the radar test chamber. In some examples, debris, water, or other objects can be positioned on a radome used by the radar hardware to simulate road debris and weather conditions that vehicles can encounter. Furthermore, the radar units can adjust positions, heights, and perform other actions to further simulate different aspects that a vehicle radar system can experience.

The radar hardware tests can be performed to generate one or more outputs that can be used to compare against the expected outcome(s) (i.e., the golden data). The radar hardware and target can be located within a radar test chamber according to known dimensions, which can enable comparing the outputs obtained when executing according to the software update to expected results. The expected results can be produced by the functional model designed to factor the known testing dimensions and conditions that the radar hardware is being tested under. As such, by utilizing a radar test chamber, radar software can be efficiently tested in various simulated conditions to check for bugs or other potential errors within the code. This can enable radar units to be updated with thoroughly tested software and avoid potential pitfalls that can arise when providing untested software to radar systems on vehicles.

Some techniques involve applying HIL testing with CI to provide an adjustable and timely status (e.g., every 10 minutes, every hour) on the health of radar FPGA firmware and onboard software used by vehicle radar systems. For example, while vehicle radar systems perform in various environments in the real-world, testing techniques can also be performed in parallel to check for potential bugs in the code that is also currently executed at vehicle radar systems. In other examples, upgrades or patches can be thoroughly developed and tested before deployment to vehicles for implementation. In addition, the combination of CI with HIL can enable building FPGA bit streams and subsequent testing on production radar hardware. This lighter weight test environment using radar hardware can provide a valuable tool for triaging issues that could be much more difficult to detect when in use on the self-driving vehicle.

In some embodiments, the radar HIL tests can involve using one or more pseudo random data generators implemented in a functional model (e.g., a C-model) and at the FPGA undergoing testing. As such, the HIL tests can further involve comparing respective outputs obtained from hardware and the C-model with C-model representing the golden reference. As such, two or more data generators can be added to the radar pipeline for HIL testing.

The disclosed operations can reduce the time and resources needed to facilitate consistent desired performance for the radar system. This can also enable the vehicle radar system to periodically check the quality of software and/or firmware operating on vehicles as-needed and before an undesired level of performance degradation occurs, thereby helping the vehicle radar system maintain desired performance and adapt to changes without having to take the vehicle out of operation to re-calibrate. Example embodiments can also be implemented across a variety of radar array topologies (e.g., multiple-input multiple-output (MIMO), single-input, multiple-output (SIMO)) and waveforms (e.g., low, medium, or high pulse repetition frequency (PRF)).

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates. In addition, radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 further includes power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
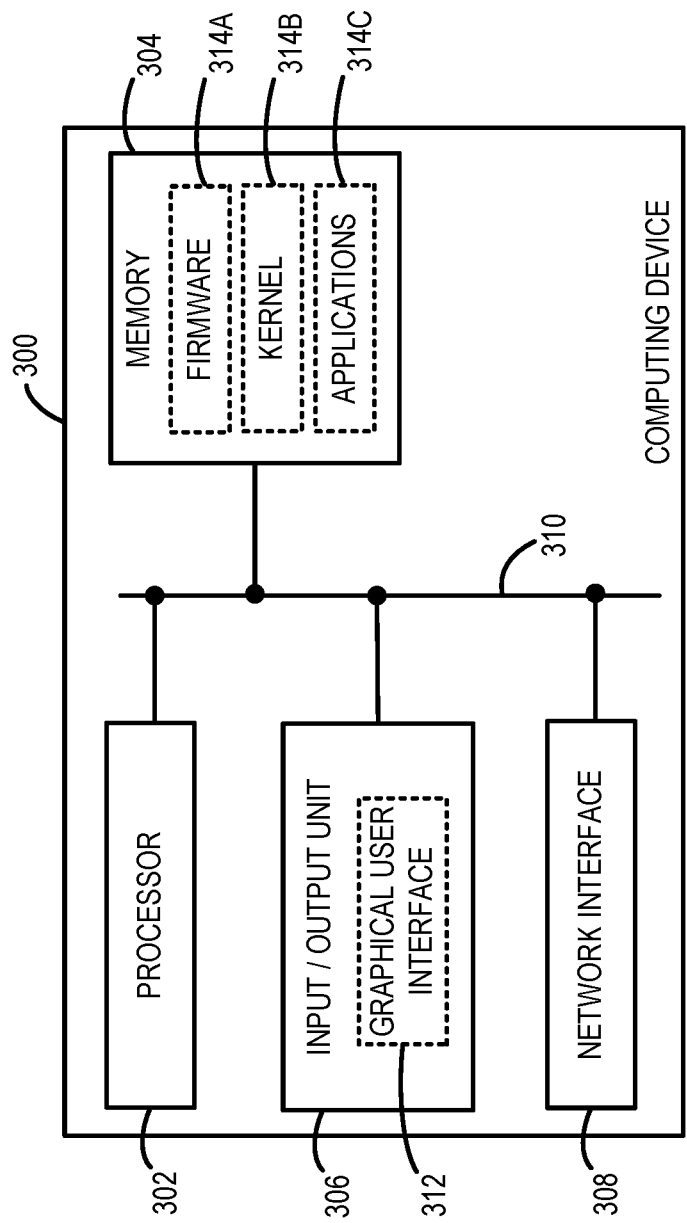
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles. In some examples, computing device 300 may operate relative to one or more radar test chambers that can be used for operations disclosed herein.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including adverse road conditions detection techniques using radar or another type of sensor data.

Figure 4:
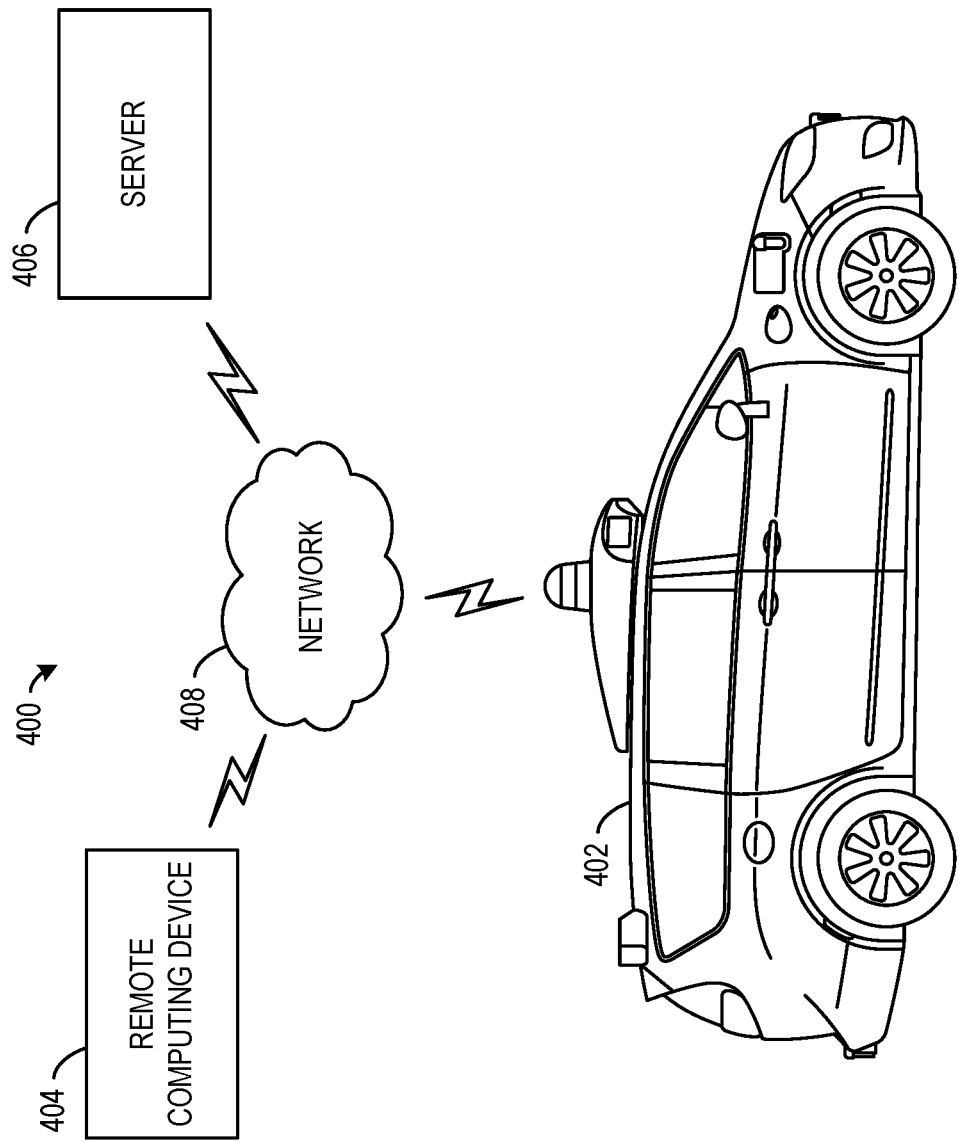
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles.

When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, remote computing device 404 and/or server 406 may communicate software updates to vehicle 402 via network 408. For instance, remote computing device 404 and/or server 406 may perform radar testing and development tests described herein and subsequently distribute updated radar software to vehicle 402 and other vehicles operating in various environments via network 408. Server 406 can also provide one or more data storage options for developers to contribute software code and firmware code for CI techniques and subsequent HIL testing operations disclosed herein. Vehicle 402 can also provide indications of sensor issues to remote computing device 404 and/or server 406. For instance, vehicle 402 can provide alerts that indicate issues with vehicle radar system operations. Remote computing device 404 and/or server 406 may use these alerts to initiate further testing of patches and/or upgrades that can reduce or eliminate the issues at the vehicle radar system.

Figure 5:
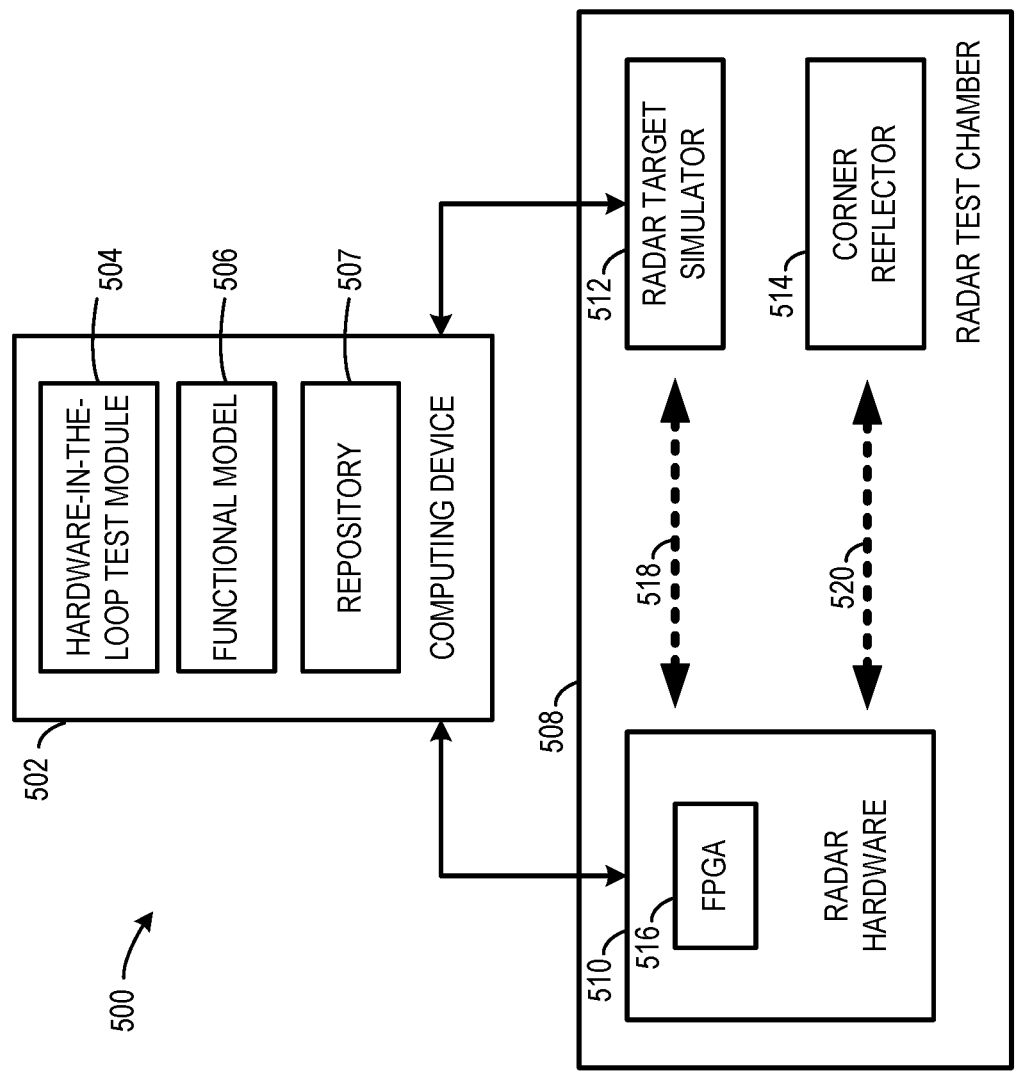
FIG. 5 is a block diagram for a system for radar testing and development, according to one or more example embodiments.

FIG. 5 is a block diagram for a system for radar testing and development, according to one or more example embodiments. In particular, system 500 represents an example system that can be used to perform radar testing and development operations that leverage HIL testing and/or CI. The disclosed operations can enable system 500 to perform continuous tests of radar software and firmware executable on vehicle radar systems, including corresponding FPGAs used for processing signals received from the environment.

In some examples, system 500 may be used to continuously check for potential bugs on software currently in use by one or more vehicles operating in the real world. For instance, system 500 can be used as a parallel check that tests how the current software and firmware performs in different conditions that vehicles may potentially encounter when navigating in different locations. In other examples, system 500 may be used to review and debug potential software and firmware updates prior to distribution to vehicles in the real world.

In the example embodiment shown in FIG. 5, system 500 includes computing device 502 and radar test chamber 508 equipped with radar hardware 510, radar target simulator 512, and corner reflector 514. In addition, computing device 502 is further shown with HIL test module 504, functional model 506, and repository 507. In other examples, system 500 may include more or fewer components in other potential arrangements. In addition, components can be combined or further divided in other implementations.

Computing device 502 may include one or more processors configured to perform testing and development operations presented herein. In some examples, computing device 502 may be implemented as computing system 112 shown in FIG. 1, computing device 300 shown in FIG. 3 or remote computing device 404 or server 406 shown in FIG. 4. In some embodiments, computing device 502 may represent a network of multiple computing devices configured to perform example techniques in a distributed manner. In the example embodiment shown in FIG. 5, computing device 502 includes HIL test module 504, functional model 506, and repository 507. These components are shown for illustration purposes and computing device 502 may include other components that are not shown in FIG. 5, such as one or more types of communication interference.

HIL test module 504 may perform operations related to HIL testing of radar software code and/or firmware. In practice, HIL can provide a framework that can be used in physical and virtual prototyping of software, including embedded software that is computational software written to control machines or devices. In particular, embedded software can be specialized for the particular hardware that it runs on and may have time and memory constraints. Embedded software executable on FPGA 516 and other components may also be described as firmware. As such, HIL can be used to test radar software and firmware according to various techniques presented herein.

In some examples, HIL test module 504 may perform one or more HIL tests in which parts of a pure simulation have been replaced by actual physical components, such as radar hardware 510, radar target simulator 512, and/or corner reflector 514 located within radar test chamber 508. As described herein, the tests can involve analyzing different parameters of radar operation using potential upgrades or software patches prepared via CI from multiple developers in some instances.

Functional model 506 may represent a structured representation of the functions (e.g., processes, operations) within a modeled system. In some examples, functional model 506 is a C-model designed for radar hardware and FPGA testing. In some instances, functional model 506 may be created with a functional modeling perspective, which can focus on describing the dynamic process. Functional model 506 may implement desired algorithms to generate a target output, also referred to herein as golden data. In particular, functional model 506 may generate the golden data based on software code tested from a repository with the golden data representing expected data from a radar unit running the software code. In some examples, functional model 506 is designed based on desired behaviors, which can be programmed using more descriptive language that does not necessarily require code optimization. For example, developers can use Mat Lab or another programming software.

A HIL test performed by HIL test module 504 may involve multiple aspects. For instance, HIL test module 504 may involve a simulation of radar code from repository 507. In particular, repository 507 can represent one or more databases or other types of data storage that can enable CI where software developers contribute portions of radar software code and/or firmware updates. In some examples, vehicles operating in the real-world may utilize the software and firmware within repository 507. As a result, changes contributed to code within repository 507 may be subsequently distributed to vehicles in near real-time and/or after one or more rounds of testing is completed.

Computing device 502 can perform radar tests that involve using radar test chamber 508, radar hardware 510, radar target simulator 512, and corner reflector 514. For instance, HIL test module 504 may run a sequence that includes powering on radar hardware 510, running radar software and firmware, capturing radar data, and comparing the radar hardware data against a target output from functional model 506. HIL test module 504 can run as part of a CI framework, which can continuously use the latest codebase on each run. As such, the output from each HIL test can be archived and project owners may be notified of failures. The project owners can then identify when a bug has been introduced into the code base based on the notifications.

As further shown in FIG. 5, computing device 502 can also communicate with radar test chamber 508. For instance, computing device 502 can communicate with radar hardware 510, radar target simulator 512, and/or corner reflector 514 using wired and/or wireless communication.

Radar test chamber 508 represents any type of testing environment that can be used to perform operations described herein. For instance, radar test chamber 508 can be an enclosure designed to absorb reflections and electromagnetic waves. In the example embodiment shown in FIG. 5, radar test chamber 508 includes radar hardware 510, radar target simulator 512, and corner reflector 514. In other examples, radar test chamber 508 can include other components.

Radar hardware 510 represents one or more radar units that can transmit and/or receive radar signals. For example, radar hardware 510 may include physical parts of a radar unit (e.g., radome, antenna, and printed circuit board assembly (PCBA)). In some examples, radar test chamber 508 may include multiple radar units.

In the example embodiment, radar hardware 510 includes FPGA 516, which represents an integrated circuit with a large number of generic digital logic cells that can be dynamically connected to create building blocks capable of basic digital functions. These components can then be combined to produce more sophisticated logic, and so on until very complex functionality is realized. FPGAs are well suited to implement pipeline computations that can be highly parallelized, such as filtering, frequency conversion, and FFTs. As a result, analog and discrete digital components can be implemented in the reconfigurable digital environment of FPGA 516.

Radar hardware 510 may further include one or more devices that include digital input/output (I/O) connections for bringing signals into and out of one or more semiconductor chips, which can be located at computing device 502 during testing. The number of digital I/O lines can be numerous in some implementations. Processing within FPGA 516 is driven by clock signals, which gate the digital data through the configured cells.

A FPGA configuration for FPGA 516 and other FPGAs for radar units implemented on vehicles can be specified with a hardware specification language (HDL), such as VHSIC Hardware Description Language (VHDL) or Verilog, among other possible options. The hardware specification language can enable developers to create text descriptions that define the connections and operations of entities, such as signals, registers, and busses. Basic logic and numeric operations (e.g., latching, addition and shifting) can be defined in the language and computational components can be constructed from these building blocks. These components can then be electrically connected to implement a complete control and signal processing system.

Firmware development may involve editing HDL files, testing via simulation, synthesizing a bitstream, downloading the bitstream to FPGA 516, testing and debugging, and returning to editing. Some of these steps can be quite lengthy. As a result, disclosed techniques can accelerate the development of firmware that operates on FPGA 516. For testing FPGA 516, a test vector of simulated inputs can be created and transmitted to FPGA 516 with the clock input of FPGA 516 driven to run the simulation. The outputs from FPGA 516 can then be verified for correct behavior. In addition, higher level modules composed of multiple components (e.g., radar hardware 510) can also be simulated and tested in the same manner.

In some examples, the accuracy of the simulations may pass when the HDL simulates properly, and the synthesis step is free of errors, indicating that the generated firmware can be determined to execute properly on FPGA 516. As such, crafting and successfully passing simulation test benches can be critical to creating reliable FPGA firmware designs. In some instances, the synthesis step can involve converting the HDL description into a specification for the digital cell connections on FPGA 516, which can involve several sub-steps. The language description can be initially translated into a network of logical register specifications, which can then be mapped onto the basic component types available on FPGA 516. The logical network can then be assigned to the actual logic cells within FPGA 516, which can be described as "place and route." The place and route task can be both combinatorial and heuristic in some examples. As such, the development tools can provide facilities that allow developers to provide some guidance, such as suggesting logical locations to place major components of the design. The place and route algorithm can be iterative, as the software attempts to converge on a solution that meets the timing requirements. In some examples, the synthesis part of the workflow can cause workflow to be tedious for FPGA 516. This is another reason why simulation can greatly enhance the development cycle for FPGA updates and patches.

The product of synthesis is the "bitstream", which represents the lowest level specification of FPGA 516 connections. The bitstream can be made available to FPGA 516. For instance, the bitstream can be downloaded directly to FPGA 516 or burned into a non-volatile memory such as an EEPROM, which can be later loaded into FPGA 516. In some examples, the download can be performed via a joint test action group (JTAG) interface that provides a direct hardware connection to FPGA 516. In other examples, FPGA 516 can be part of a card located radar hardware 510. In some examples, when FPGA 516 has been configured with the bitstream (e.g., the firmware update), system testing and debugging can be performed. If problems are detected at FPGA 516, debugging can be initiated, which may involve altering the system configuration in order to expose and diagnose FPGA 516 behavior. In addition, firmware probes can be inserted into the HDL code so that the logic behavior can be tracked directly within the operating FPGA 516. In some examples, a processing algorithm can be written in a high-level language, such as Mat lab. This code is then compiled to produce a firmware component that can be integrated with the HDL code. In particular, Matlab can enable crafting signal processing elements such as filters, fast Fourier transforms, etc. As such, the full functionality of Mat lab is available to investigate and characterize the performance of these components.

FPGA 516 can provide the computational foundation for a radar controller and signal processor and may be integrated with other hardware. For instance, a transceiver card can be used to provide receive, transmit and control signal functions. In addition, FPGA 516 can also be combined with analog-to-digital and digital-to-analog converters, local memory, digital I/O lines and bus interfaces for radar hardware 510. The transceiver card can replace a large number of discrete components, which can eliminate design, construction and testing of some expensive analog sections. Because the frequency conversion and filtering occur in the digital domain, the processing responses are completely matched and characterized without any measurement procedures. Most important though, is that all of these functions can be tailored for specific applications, with no additional hardware modification.

Radar hardware 510 can have different components within examples. In some examples, radar hardware 510 is mounted on a pivoting mount, linear actuator, or another type of mechanical structure that can allow for testing in azimuth and enable other motions or adjustments of radar hardware 510 relative to one or more targets. For example, computing device 502 may enable rotation of radar hardware 510 to enable transmission of radar signals at different orientations relative to targets from radar target simulator 512 and corner reflector 514. For example, computing device 502 can adjust position, orientation, and other parameters for radar hardware 510 while also causing radar hardware 510 to transmit radar signals 518 toward radar target simulator 512 and/or radar signals 520 toward corner reflector 514. These different changes and motions can be predefined and factored by functional model 506 when developing expected outputs used to gauge performance of radar hardware 510 under various testing conditions.

Radar target simulator 512 represents one or more modules that can simulate one or more targets for testing the performance of radar hardware 510 when implementing radar parameters. The performance of each radar target simulator 512 can vary within examples. The evaluation of RF sensors (e.g., radar hardware 510) may involve a test capability where various RF scenes are presented to the unit under test. These scenes may need to be dynamic, represent multiple targets and/or decoys, emulate dynamic motion, and/or simulate real world RF environmental conditions. As such, radar target simulator 512 can be used to replicate these various scenes. Corner reflector 514 represents one or more reflectors that can also be used as targets to test the performance of radar hardware 510.

Computing device 502 can perform a variety of operations using radar test chamber 508 to enable testing the execution of radar software in various conditions. For example, computing device 502 can trigger adjustments in the temperature in radar test chamber 508 to enable testing performance of radar hardware 510 in different temperature conditions that may be experienced by vehicles. Computing device 502 can also adjust the humidity within radar test chamber 508.

In some embodiments, computing device 502 may adjust performance factors of radar hardware 510. For instance, computing device 502 can cause water, dirt, or other debris to be positioned on the radome to test performance.

Some examples may involve computing device 502 running a simulation that can further involve injecting fake data at the beginning of the digital signal processing (DSP) pipeline. On the other hand, when not using simulated data, computing device 502 may receive radar signals at one or more analog-to-digital converters (ADCs) with each ADC configured to translate received reflection energy to digital information. In both simulation mode and non-simulation mode, computing device 502 can be configured to check output data. For instance, in simulated mode, computing device 502 may compare output data from HIL test module 504 against the output of functional model 506. In non-simulated mode, computing device 502 can compare output data from radar hardware 510 against expected outputs generated based on parameters associated with testing radar hardware 510 via radar target simulator 512 and corner reflector 514 within radar test chamber 508. Using actual production hardware (e.g., radar hardware 510) can enable further checking and make up for deficiencies in models (e.g., functional model 506).

In some examples, a hybrid model can be used that involves computing device 502 sending RF and running real ADC data to enable capturing both raw ADC data as well as the processed output data. This can enable us to check both functional model 506 operations and using radar test chamber 508 results as well.

Figure 6:
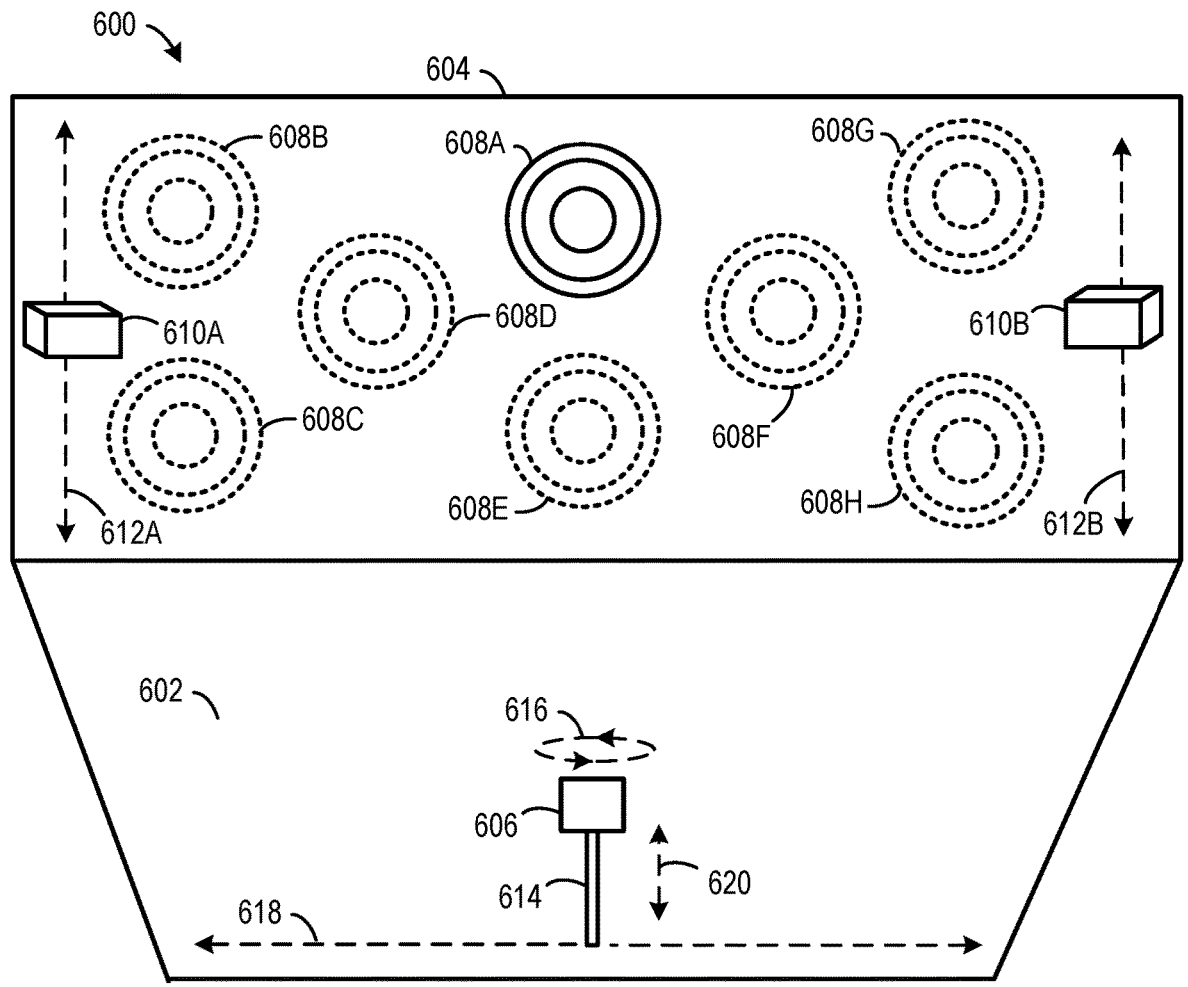
FIG. 6 illustrates a radar testing chamber, according to one or more example embodiments.

FIG. 6 illustrates a radar testing chamber, according to one or more example embodiments. In the example embodiment, system 600 includes radar test chamber 602, adjustable target simulator 604, radar unit 606, corner reflector 610A, and corner reflector 610B. As such, system 600 is shown to represent one example configuration that can be used by a computing system to test radar software and firmware in an efficient manner prior to distribution to one or more vehicles (e.g., a fleet of vehicles). Other configurations may involve multiple radar units, different target layouts, and/or additional components (e.g., other emitters), etc.

System 600 can be used for testing and development of radar software. Particularly, prior to distributing updates to radar firmware and/or the software used by a controller associated with a radar system, tests can be performed via system 600 to check for potential issues or bugs within the firmware and/or software. By testing and developing using radar test chamber 602, calibration can be performed and potential updates can be thoroughly examined prior to distribution. In turn, issues that can arise when using new software and/or firmware updates locally on vehicles in various environments can be avoided, which enables vehicles to continue operations without delays. In addition, such techniques using HIL testing and CI enable efficient updating without the time constraints typically associated with radar testing and development.

Radar test chamber 602 can be designed to simulate a variety of environments for testing. Particularly, subsystems within radar test chamber 602 can be adjusted by a computing device to test a variety of different conditions that vehicles may encounter while navigating the real world, including various temperature and weather conditions. For instance, radar test chamber 602 can enable adjusting testing temperature to check how radar unit 606 performs in cold and hot temperatures and humidity levels to check how radar unit 606 performs across different levels of humidity. In addition, radar test chamber 602 may also be able to simulate potential interference by including additional emitters and/or simulating the presence of electromagnetic energy at RF levels that help test performance of radar unit 606 within potential interference conditions.

Adjustable target simulator 604 may take on various configurations and can simulate one or more targets within radar test chamber 602 for testing signal transmission and reception by radar unit 606. In some examples, adjustable target simulator 604 can provide one or more targets for testing the performance of radar unit 606. In the example embodiment, adjustable target simulator 604 is providing target 608A to enable testing the performance of radar unit 606. Adjustable target simulator 604 may also simulate a target in other positions and ranges as represented by targets 608B, 608C, 608D, 608E, 608F, 608G, 608H. In addition, adjustable target simulator 604 can provide multiple targets to enable testing if radar unit 606 can capture measurements that can differentiate between the targets.

In some examples, adjustable target simulator 604 can be configured to receive a radar signal transmitted by radar unit 606 and subsequently transmit a response signal representing a reflection back towards radar unit 606. By adjusting the duration that passes prior to transmitting the response signal, adjustable target simulator 604 can simulate targets at different ranges. In addition, other variables of targets can be simulated, including adjusting the measurable cross section, the orientation of the target relative to radar unit 606, and representing different reflectivity levels. Adjustable target simulator 604 can also simulate targets in motion. In particular, adjustable target simulator 604 can adjust a Doppler frequency measured by radar unit 606 during testing.

Radar test chamber 602 further includes corner reflectors 610A, 610B, which represent retroreflectors that can reflect radar signals back as reflection signals toward radar unit 606. In some examples, corner reflectors 610A, 610B may have an orientation that enables reflecting at least a portion of a radar signal back toward radar unit 606. In the example embodiment shown in FIG. 6, corner reflector 610A can adjust its vertical position 612A relative to the ground and corner reflector 610B can adjust its vertical position 612B relative to the ground, which enables tests involving targets at different heights. Corner reflectors 610A, 610B can also adjust horizontal positioning relative to radar unit 606. For instance, one or both corner reflectors 610A, 610B can be configured to move across radar test chamber 602.

Radar unit 606 represents radar hardware that can be used to test radar software and firmware. As such, radar unit 606 can have one or more antennas, a radome, and other hardware. Radar unit 606 can also be associated with a FPGA, which may be coupled to radar unit 606.

In the example embodiment shown in FIG. 6, radar unit 606 is positioned on stand 614, which can enable rotation, roll, or yaw 616 of radar unit 606. By rotating, rolling, or adjusting the yaw of radar unit 606, tests can be performed to test azimuth and other operational aspects during transmission and reception. In addition, stand 614 further enables radar unit 606 to move in different directions 618 during testing and can raise or lower height 620 to replicate different potential positions on a vehicle.

Figure 7:
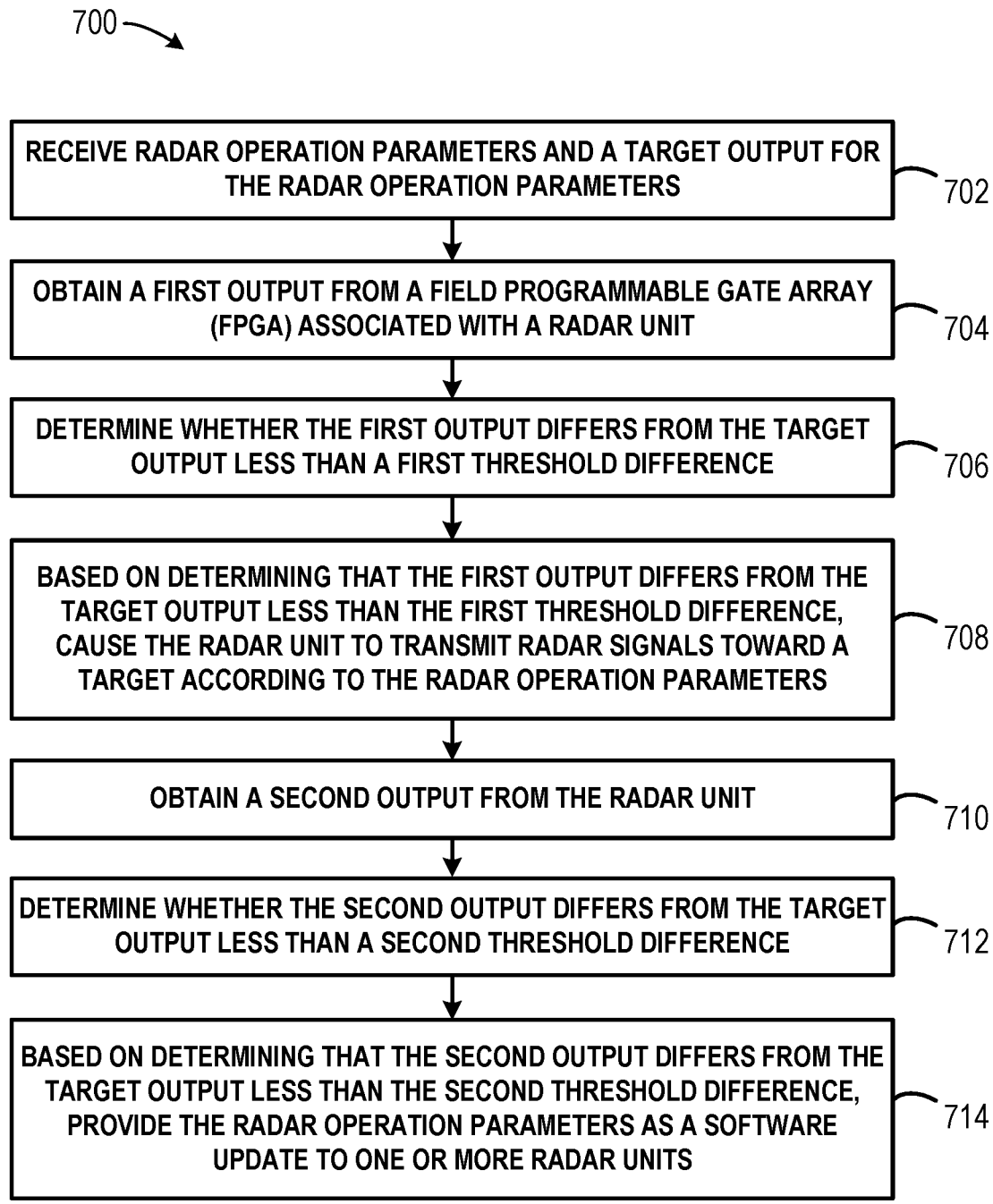
FIG. 7 is a flow chart of a method for radar development using HIL testing with CI, according to one or more example embodiments.

FIG. 7 is a flow chart of a method for detecting adverse road conditions in real-time using radar, according to one or more example embodiments. Method 700 may include one or more operations, functions, or actions, as depicted by one or more of blocks 702, 704, 706, 708, 710, 712, and 714 each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Method 700 can be performed in whole or in part by a computing device coupled to a vehicle, such as a device similar to or the same as computing system 112 of FIG. 1, computing device 300 of FIG. 3, remote computing device 404 and/or server 406, and/or computing device 502 of FIG. 5 described above.

At block 702, method 700 involves receiving radar operation parameters and a target output for the radar operation parameters. For instance, a computing device operating may receive the radar operation parameters in the form of software code that can be used by the computing device to cause a radar unit to transmit radar signals having particular properties.

In some examples, method 700 may further involve obtaining the radar operation parameters from a shared repository, which may represent a database of software contributed by radar software developers. The radar operation parameters may correspond to a radar software code designed for use by a vehicle radar system and may indicate waveform parameters and a center frequency for radar signal transmission. As such, a functional model (e.g., a c-model) may be used to generate the target output based on the radar operation parameters.

At block 704, method 700 involves obtaining a first output from a field programmable gate array (FPGA) associated with a radar unit. The FPGA may generate the first output based on the radar operation parameters. In some examples, the computing device may provide the radar operation parameters to the FPGA, which is coupled to the radar unit positioned in a radar test chamber and receive the first output from the FPGA. The first output may be represented as bit information. Bit information may represent bitstream data output by the FPGA.

At block 706, method 700 involves determining whether the first output differs from the target output less than a first threshold difference. In some examples, the computing device may determine whether the bit information of the first output matches the bit information of the target output. For instance, the bitstream output from the FPGA may be compared and expected to match the bitstream output by a functional model (e.g., a C-model) that simulates expected results for the FPGA.

The computing device may perform a comparison between the first output and the target output. Based on the comparison, the computing device may determine a difference between the first output and the target output. The computing device may then determine if the difference is less than the first threshold difference. In some instances, the computing device may determine that the difference is more than the first threshold difference and provide an alert that indicates that the first output differs from the target output more than the first threshold difference based on determining that the difference is more than the first threshold difference. In some examples, the computing device may provide an indication of the difference with the alert.

At block 708, method 700 involves causing the radar unit to transmit radar signals toward a target according to the radar operation parameters based on determining that the first output differs from the target output less than the first threshold difference. In some examples, the computing device may cause the radar unit to transmit radar signals toward an adjustable target located in a radar test chamber. The adjustable target can be configured to simulate the target positioned at a given range relative to the radar unit. For instance, the computing device may be configured to cause the radar unit to transmit first radar signals with the adjustable target representing the target at a first range relative to the radar unit, provide instructions to adjust a range for the adjustable target, and cause the radar unit to transmit second radar signals with the adjustable target representing the target at a second range relative to the radar unit.

In some examples, the computing device may cause the radar unit to transmit radar signals toward a corner reflector. The corner reflector may be a retroreflector configured to reflect a portion of each radar signal back toward the radar unit as a reflection signal.

In some examples, the radar unit is positioned on a pivoting mount configured to enable rotation of the radar unit. As such, the computing device may cause the radar unit to transmit first radar signals toward the target when the radar unit is at a first orientation relative to the target and subsequently rotate the radar unit from the first orientation relative to the target to a second orientation relative to the target. The computing device may then cause the radar unit to transmit second radar signals toward the target when the radar unit is at the second orientation relative to the target.

In some examples, the computing device may cause the radar unit to transmit radar signals toward the target as the radar unit moves from a first location to a second location. The target can also be an adjustable target configured to simulate the target in motion. As such, the computing device may cause the radar unit to transmit radar signals as the adjustable target simulates the target in motion.

At block 710, method 700 involves obtaining a second output from the radar unit. The radar unit may generate the second output based on reflection signals from the target.

At block 712, method 700 involves determining whether the second output differs from the target output less than a second threshold difference. In some examples, the second threshold enables a greater variation than the first threshold difference.

In some examples, the computing device may determine power levels based on the reflection signals from the target. As such, the computing device may determine whether the power levels differ from expected power levels in the target output less than the second threshold difference. For example, the computing device may determine a difference between the power levels and the expected power levels is greater than the second threshold difference and provide an alert that indicates the difference between the power levels and the expected power levels is greater than the second threshold difference.

At block 714, method 700 involves providing the radar operation parameters as a radar software update to one or more radar units based on determining that the second output differs from the target output less than the second threshold difference. For instance, the system may provide radar software updates via over-the-air updates to radar units operating on vehicles in various environments.

In some examples, the radar unit and the target are located in a radar test chamber. As such, the computing device may adjust temperature of the radar test chamber during transmission of radar signals. In addition, the radar unit may include a radome. As such, the computing device may adjust an exterior condition of the radome. For instance, the computing device may trigger dirt, water, and/or other substances to be sprayed onto the radome to test performance during subsequent signal transmission and reception.

Figure 8:
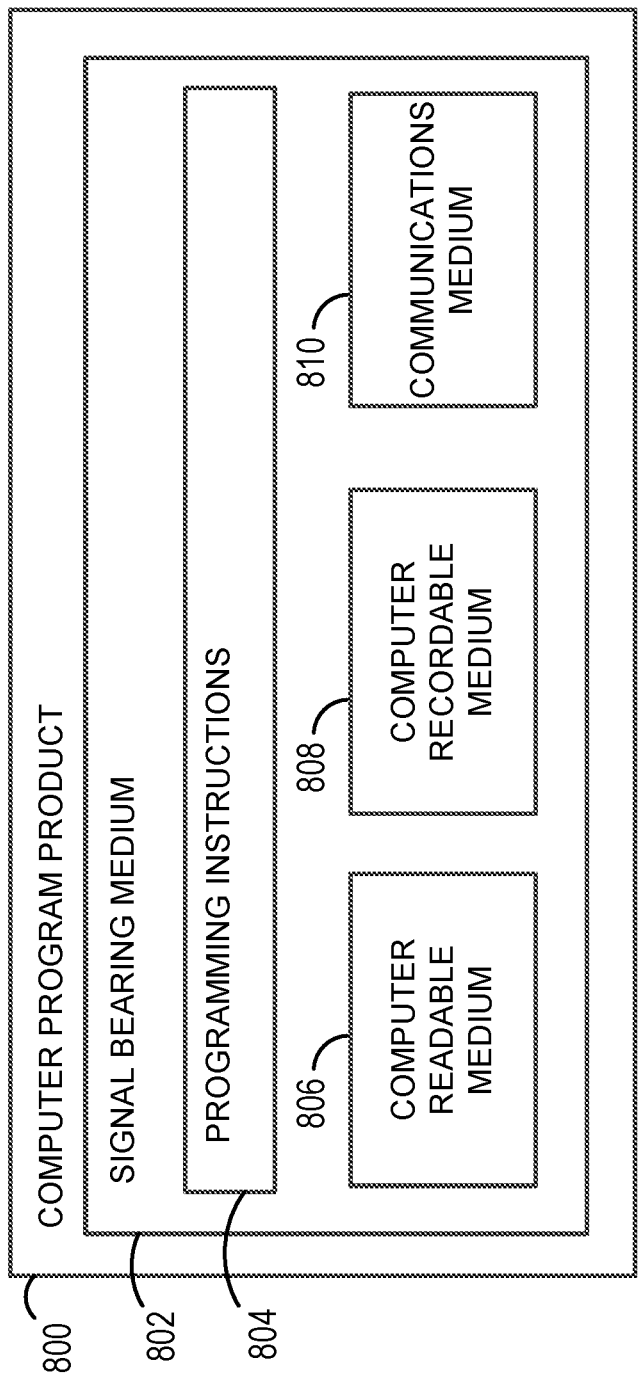
FIG. 8 is a schematic diagram of a computer program, according to one or more example embodiments.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described as functional entities that may be implemented as discrete or distributed components or in conjunction with other components, in any suitable combination and location.

What is claimed is:

1. A method comprising:
   receiving, at a computing device, radar operation parameters and a target output for the radar operation parameters;
   obtaining, at the computing device, a first output from a field programmable gate array (FPGA) associated with a radar unit, wherein the FPGA generates the first output based on the radar operation parameters;
   determining whether the first output differs from the target output less than a first threshold difference;
   based on determining that the first output differs from the target output less than the first threshold difference, causing the radar unit to transmit radar signals toward a target according to the radar operation parameters;
   obtaining, at the computing device, a second output from the radar unit, wherein the radar unit generates the second output based on reflection signals from the target;
   determining whether the second output differs from the target output less than a second threshold difference; and
   based on determining that the second output differs from the target output less than the second threshold difference, providing, by the computing device, the radar operation parameters as a radar software update to one or more remote radar units.

2. The method of claim 1, further comprising:
   obtaining the radar operation parameters from a shared repository, wherein the radar operation parameters correspond to a radar software code designed for use by a vehicle radar system, and wherein the radar operation parameters indicate waveform parameters and a center frequency for radar signal transmission; and
   generating, using a functional model, the target output based on the radar operation parameters.

3. The method of claim 1, wherein obtaining the first output from the FPGA associated with the radar unit comprises:
   providing the radar operation parameters to the FPGA, wherein the FPGA is coupled to the radar unit positioned in a radar test chamber; and
   receiving the first output from the FPGA, wherein the first output is represented as bit information.

4. The method of claim 3, wherein determining whether the first output differs from the target output less than the first threshold difference comprises:
   determining whether the bit information of the first output matches the bit information of the target output.

5. The method of claim 1, wherein causing the radar unit to transmit radar signals toward the target according to the radar operation parameters comprises:
   causing the radar unit to transmit radar signals toward an adjustable target located in a radar test chamber, wherein the adjustable target is configured to simulate the target positioned at a given range relative to the radar unit.

6. The method of claim 5, wherein causing the radar unit to transmit radar signals toward the adjustable target located in the radar test chamber comprises:
   causing the radar unit to transmit first radar signals with the adjustable target representing the target at a first range relative to the radar unit;
   providing instructions to adjust a range for the adjustable target; and
   causing the radar unit to transmit second radar signals with the adjustable target representing the target at a second range relative to the radar unit.

7. The method of claim 1, wherein determining whether the first output differs from the target output less than the first threshold difference comprises:
   performing a comparison between the first output and the target output;
   based on the comparison, determining a difference between the first output and the target output; and
   determining if the difference is less than the first threshold difference.

8. The method of claim 7, further comprising:
   determining that the difference is more than the first threshold difference; and
   based on determining that the difference is more than the first threshold difference, providing an alert that indicates that the first output differs from the target output more than the first threshold difference.

9. The method of claim 8, wherein providing the alert that indicates that the first output differs from the target output more than the first threshold difference comprises:
   providing an indication of the difference with the alert.

10. The method of claim 1, wherein obtaining the second output from the radar unit comprises:
    determining power levels based on the reflection signals from the target; and
    wherein determining whether the second output differs from the target output less than the second threshold difference comprises:
    determining whether the power levels differ from expected power levels in the target output less than the second threshold difference.

11. The method of claim 10, wherein determining whether the power levels differ from expected power levels in the target output less than the second threshold difference comprises:
    determining a difference between the power levels and the expected power levels is greater than the second threshold difference; and providing an alert that indicates the difference between the power levels and the expected power levels is greater than the second threshold difference.

12. The method of claim 1, wherein causing the radar unit to transmit radar signals toward the target according to the radar operation parameters comprises:
causing the radar unit to transmit radar signals toward a corner reflector, wherein the corner reflector is a retroreflector configured to reflect a portion of each radar signal back toward the radar unit as a reflection signal.

13. The method of claim 1, wherein the radar unit is positioned on a pivoting mount configured to enable rotation of the radar unit; and
wherein causing the radar unit to transmit radar signals toward the target according to the radar operation parameters comprises:
causing the radar unit to transmit first radar signals toward the target when the radar unit is at a first orientation relative to the target;
rotating the radar unit from the first orientation relative to the target to a second orientation relative to the target; and
causing the radar unit to transmit second radar signals toward the target when the radar unit is at the second orientation relative to the target.

14. The method of claim 1, wherein causing the radar unit to transmit radar signals toward the target according to the radar operation parameters comprises:
causing the radar unit to transmit radar signals toward the target as the radar unit moves from a first location to a second location.

15. The method of claim 1, wherein the target is a adjustable target configured to simulate the target in motion; and
wherein causing the radar unit to transmit radar signals toward the target according to the radar operation parameters comprises:
causing the radar unit to transmit radar signals as the adjustable target simulates the target in motion.

16. A system comprising:
a radar unit having a field programmable gate array (FPGA);
a computing device configured to:
receive radar operation parameters and a target output for the radar operation parameters;
obtain a first output from the FPGA, wherein the FPGA generates the first output based on the radar operation parameters;
determine whether the first output differs from the target output less than a first threshold difference;
based on determining that the first output differs from the target output less than the first threshold difference, cause the radar unit to transmit radar signals toward a target according to the radar operation parameters;
obtain a second output from the radar unit, wherein the radar unit generates the second output based on reflection signals from the target;
determine whether the second output differs from the target output less than a second threshold difference; and
based on determining that the second output differs from the target output less than the second threshold difference, provide the radar operation parameters as a radar software update to one or more remote radar units.

17. The system of claim 16, wherein the second threshold difference enables a greater variation than the first threshold difference.

18. The system of claim 16, wherein the radar unit and the target are located in a radar test chamber, and wherein the computing device is further configured to:
cause the radar unit to transmit first radar signals toward the target according to the radar operation parameters;
adjust a temperature of the radar test chamber; and
cause the radar unit to transmit second radar signals toward the target according to the radar operation parameters.

19. The system of claim 16, wherein the radar unit and the target are located in a radar test chamber, wherein the radar unit includes a radome, and wherein the computing device is further configured to:
cause the radar unit to transmit first radar signals toward the target according to the radar operation parameters;
adjust an exterior condition of the radome; and
based on adjusting the exterior condition of the radome, cause the radar unit to transmit second radar signals toward the target according to the radar operation parameters.

20. A non-transitory computer-readable medium configured to store instructions, that when executed by a computing system comprising one or more processors, causes the computing system to perform operations comprising:
receiving radar operation parameters and a target output for the radar operation parameters;
obtaining a first output from a field programmable gate array (FPGA) associated with a radar unit, wherein the FPGA generates the first output based on the radar operation parameters;
determining whether the first output differs from the target output less than a first threshold difference;
based on determining that the first output differs from the target output less than the first threshold difference, causing the radar unit to transmit radar signals toward a target according to the radar operation parameters;
obtaining a second output from the radar unit, wherein the radar unit generates the second output based on reflection signals from the target;
determining whether the second output differs from the target output less than a second threshold difference; and
based on determining that the second output differs from the target output less than the second threshold difference, providing the radar operation parameters as a radar software update to one or more remote radar units.

\* \* \* \* \*